March 26, 1968 W. ADLER 3,375,453

SUPPRESSED CARRIER DEMODULATION CIRCUIT

Filed Jan. 21, 1965 3 Sheets-Sheet 1

INVENTOR
WILLIAM ADLER
BY
Hopgood & Calimafde
ATTORNEYS

INVENTOR
WILLIAM ADLER
BY Hopgood & Calimafde
ATTORNEYS

INVENTOR
WILLIAM ADLER
BY
Hopgood & Calimafde
ATTORNEYS

3,375,453
SUPPRESSED CARRIER DEMODULATION CIRCUIT

William Adler, Westbury, N.Y., assignor to Servo Corporation of America, Hicksville, N.Y., a corporation of New York Filed Jan. 21, 1965, Ser. No. 426,719
4 Claims. (Cl. 329—145)

ABSTRACT OF THE DISCLOSURE

A circuit for demodulating amplitude modulated signals in which a first rectifier rectifies the full wave of the incoming signal, and a second rectifier rectifies this signal after a phase shifter has shifted the phase of the incoming signal by 90 degrees. The outputs of the first and second rectifiers are then added to produce the demodulated output signal.

This invention relates to a demodulation circuit for demodulating suppressed carrier signals without introducing any appreciable delay in the modulation envelope thereof. Although the invention can be used in many different suppressed carrier signal systems, it is particularly useful in synchro systems which require a high degree of accuracy.

In synchro systems, an AC carrier signal is amplitude modulated by rotation of the synchro transmitter shaft to produce modulated suppressed carrier signals such as illustrated by waveform A of the attached drawings. In this modulation process, the peak-to-peak amplitude of the carrier signal is varied from zero to maximum in accordance with the shaft angle of the synchro transmitter. When the transmitter shaft rotates from zero to 360 degrees, the peak-to-peak amplitude of the carrier signal defines a modulation envelope such as indicated by the dotted lines in waveform A of FIG. 1. The first half of the modulation envelope (0 to 180°) appears to be identical to the second half (180 to 360°), but the two halves are distinguishable by a 180 degree phase shift of the carrier signal, which occurs at the 0° and 180° positions of the synchro transmitter shaft.

In some servo systems, the modulated carrier signals are applied directly to a synchro receiver, where they act to rotate the synchro receiver shaft to the angle indicated by the modulation envelopes. In other systems, however, the angular information of the modulation envelope is utilized for computations, or other purposes, and in these systems, it is necessary to demodulate the carrier signal, i.e. to separate the modulation envelope from the carrier signal on which it is impressed. In the past, this has been done by rectifying the carrier signal, as shown in waveform B of FIG. 1, and then filtering the rectified signal to produce an approximation of the carrier envelope, shown in waveform C of FIG. 1. But when the signal is filtered, an appreciable time lag is introduced by the filter circuit, whereby the demodulated envelope will lag the actual modulation envelope and produce a significant error, as indicated in waveform C, where the dotted waveform indicates the actual modulation envelope, and the solid waveform indicates the output of the filter circuit. In high accuracy servo systems, this time lag error is highly undesirable, if not intolerable.

Accordingly, the principal object of this invention is to provide a novel demodulation circuit which eliminates time lag errors. Other objects and advantages of the invention will be apparent to those skilled in the art from the following description of one specific embodiment of the invention, as illustrated in the attached drawings, in which.

Figure 1:
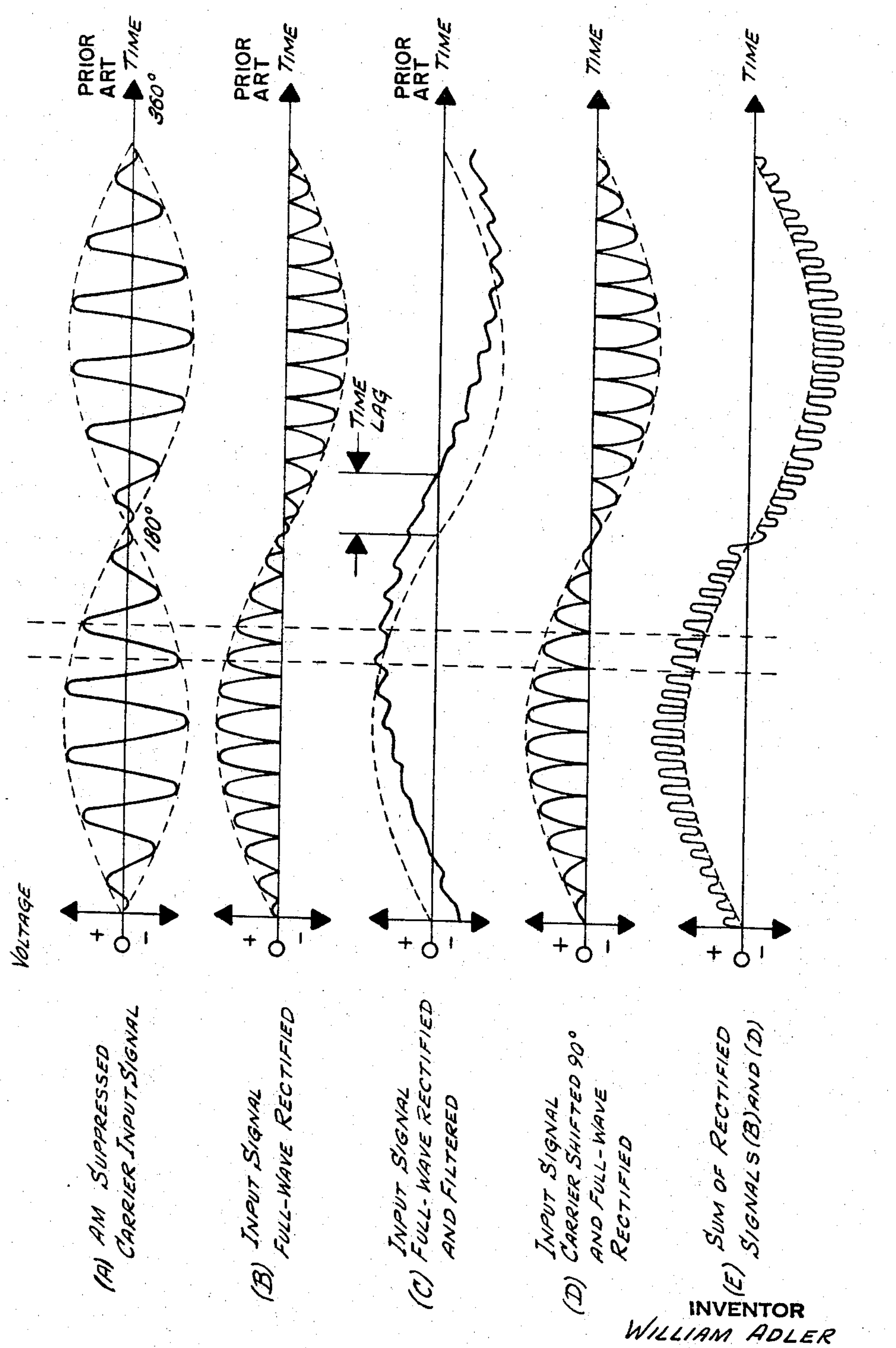
FIG. 1 is a set of waveforms showing the prior art demodulation technique and the demodulation technique of this invention.
Figure 2:
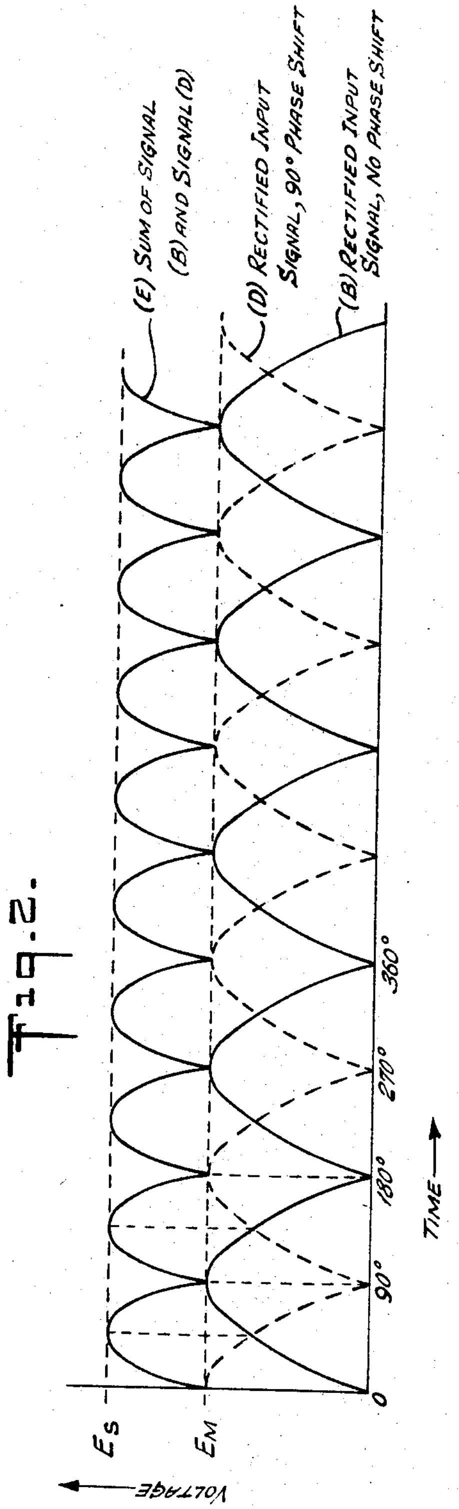
FIG. 2 is a set of waveforms showing the demodulation technique of this invention in greater detail.

In general terms, the demodulator of this invention comprises (A) rectifier means for receiving and rectifying an amplitude modulated suppressed carrier input signal; (B) phase-shift rectifier means for receiving the input signal, shifting its phase by 90 degrees, and rectifying the phase-shifted signal; and (C) addition means for adding together the output of the two rectifiers to produce a demodulated output signal which closely approximates the modulation envelope of the input signal. This novel demodulation technique is illustrated in waveforms B, C, D and E of FIG. 1 and also in FIG. 2. Waveform B of FIG. 1 shows a full wave rectified synchro signal such as encountered in prior art demodulator circuits. Waveform D shows the same signal with its phase shifted by 90°, and Fig. E shows the sum of the two full wave rectified signals. It will be noted that the sum signal contains a high frequency ripple, but that it is free of any time lag error. The ripple frequency is equal to four times the carrier signal frequency, and the peak total amplitude is equal to $\sqrt{2}E_m$ where $E_m$ is the instantaneous voltage of the modulation envelope. The above noted addition process is illustrated in greater detail in FIG. 2, which shows a constant modulation voltage.

Figure 5:
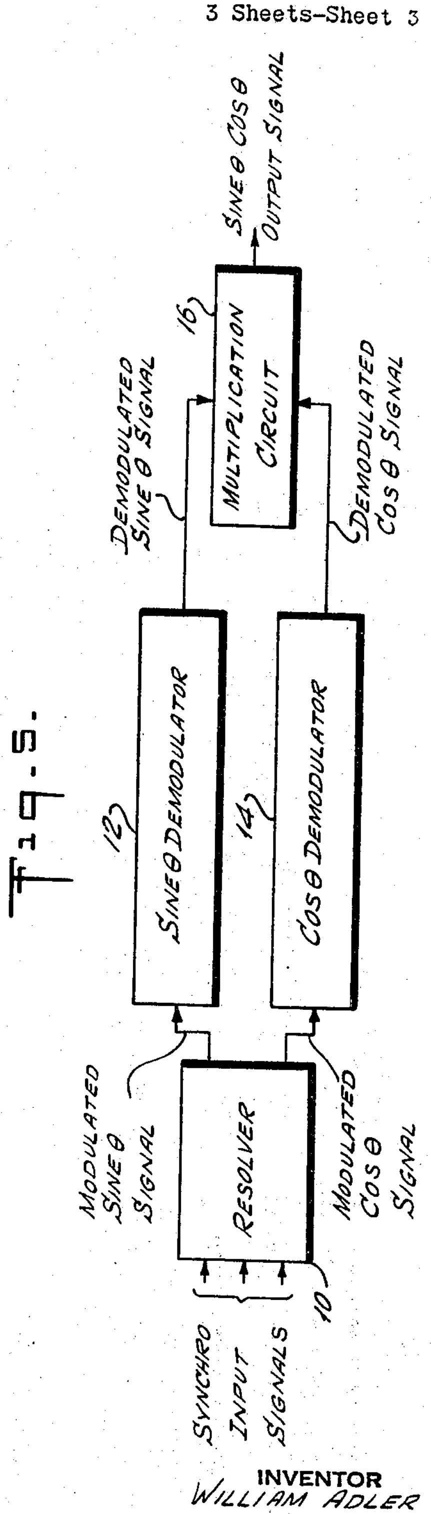
FIG. 5 is a block diagram of one suitable application of this invention.

Although it might appear that the high percentage of ripple would render the demodulated signal unusable, there are many applications where the ripple cancels itself out, as exemplified by the circuit shown in FIG. 5. In this example, three wire synchro input information is applied to a resolver 10, which reduces the information to a pair of modulated signals proportional to sin $\theta$ and cos $\theta$ respectively, where $\theta$ is the shaft angle indicated by the modulation envelopes of the synchro input signals. The sin $\theta$ and cos $\theta$ signals are demodulated in demodulators 12 and 14, and the demodulated sin $\theta$ and cos $\theta$ signals are applied to a multiplication circuit 16, which forms the cross-product sin $\theta$ cos $\theta$.

The foregoing multiplication result is added to illustrate how the invention may be embodied to eliminate the adverse effects of ripple. Suffice to say, in copending application Ser. No. 391,195, entitled Digital Code Converter, the cross products Sin $\theta'$ Cos $\theta$ and sin $\theta$ and cos $\theta'$ may be compared to eliminate the effects alluded to (where the primes denote digit equivalents of the input $\theta$ as described in the foregoing patent application).

The invention can also be used in applications which do not cancel out the ripple, but in these applications the invention reduces the time lag error instead of eliminating it. If the ripple is not cancelled out, it will be necessary to filter the output of the demodulator circuit, and this will introduce some time lag error. But since the ripple frequency in this invention is equal to twice the ripple frequency of the prior art, and since the ripple amplitude in this invention is less than half the ripple amplitude of the prior art, the time lag error will be significantly reduced by the demodulation technique of this invention.

Figure 3:
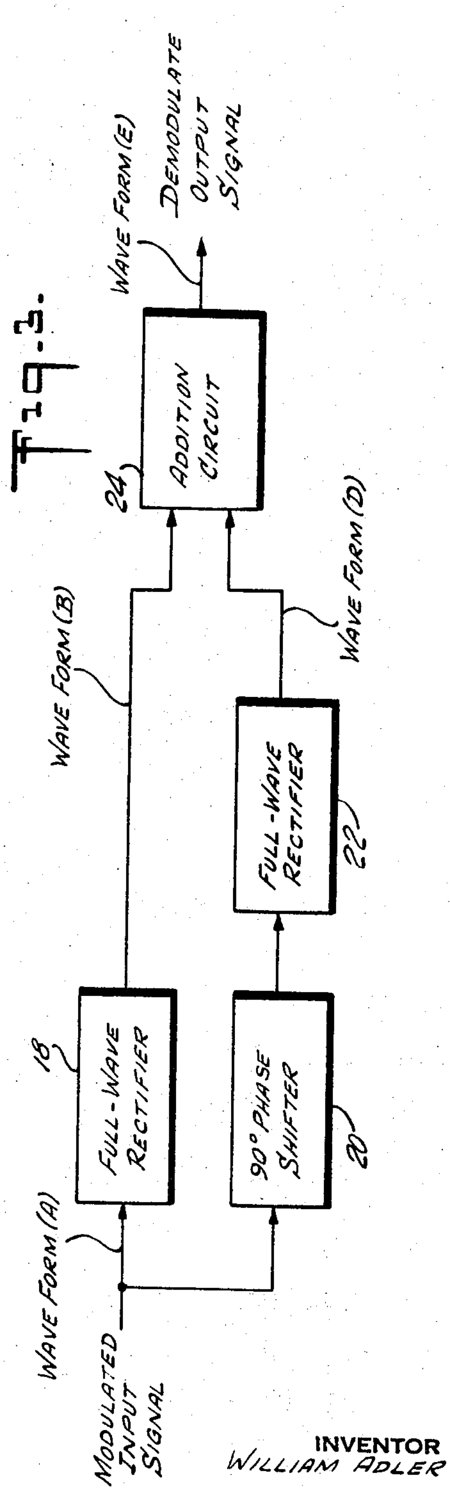
FIG. 3 is a block diagram of one embodiment of the invention.
Figure 4:
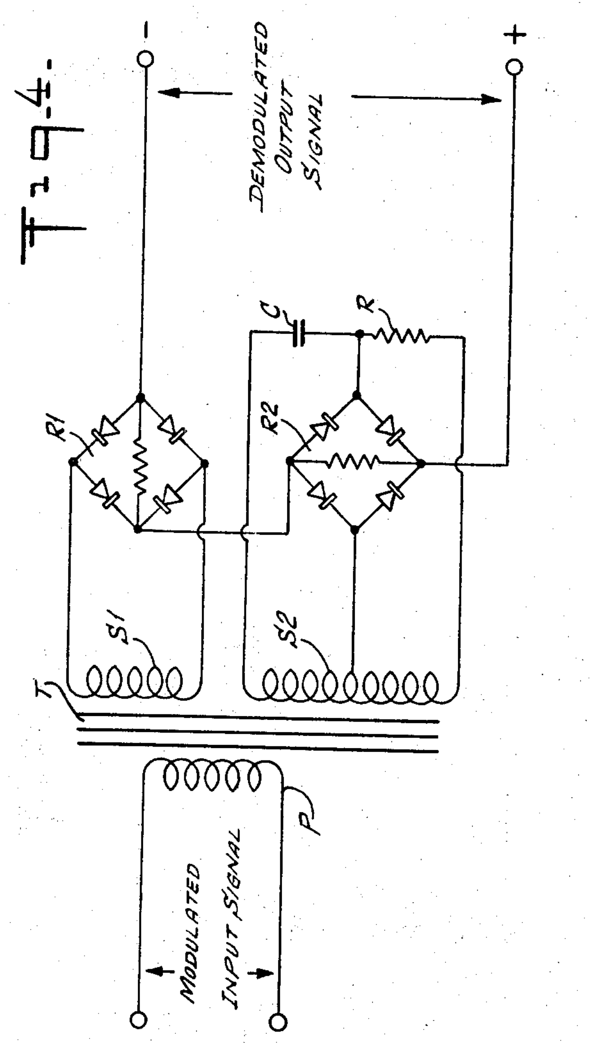
FIG. 4 is a schematic diagram of one suitable mechanization of the embodiment shown in FIG. 3.

FIGS. 3 and 4 show one illustrative embodiment of the invention, which comprises a first full-wave rectifier 18, a 90° phase shifter 20, a second full-wave rectifier 22, and an addition circuit 24. In FIG. 4, the first and second rectifier circuits comprise standard full-wave bridge rectifiers R1 and R2. Rectifier R1 is coupled across a single ended secondary winding S1 of an input transformer T, which receives the modulated input signal on a primary winding P. Rectifier R2 is coupled between the center-tap of a center-tapped secondary winding S2 and a 90° phase shift circuit comprising resistor R and capacitor C, which are coupled in series across the ends of secondary S2. The values of resistor R and capacitor C are selected so that their impedance will be equal at the carrier frequency, thereby producing a 90° phase shift in the carrier frequency due to the capacitive reactance. The load resistors of rectifier bridges R1 and R2 are connected in series aiding to produce addition of the two rectified signals, and the demodulated output signal is taken across the negative output terminal of bridge R1 and the positive output terminal of bridge R2.

From the foregoing description, it will be apparent that this invention provides a novel demodulation circuit which eliminates time lag errors due to filtering. And it should be understood that this invention is by no means limited to the specific embodiments disclosed herein, since many modifications can be made in the disclosed structure without departing from the basic teaching of this patent application. For example, an integrator circuit could be used in place of the RC phase shifter disclosed herein to shift the phase of the carrier signal by 90°. Many other modifications will be apparent to those skilled in the art, and this invention includes all modifications falling within the scope of the following claims.

I claim:

1. A demodulator circuit comprising first bridge rectifier means for receiving and rectifying an amplitude modulated suppressed carrier input signal; phase-shift means for receiving the input signal and shifting the carrier phase by 90 degrees; second bridge rectifier means coupled to the phase-shift means to rectify the phase-shifted input signal; addition means for adding together the output of the two rectifier means to produce a demodulated output signal; said addition means comprising a first resistor connected to the output of said first bridge rectifier means and a second resistor connected to the output of said second bridge rectifier means; and said first and second resistors being connected in series with each other.

2. In a synchro system, the combination comprising a resolver for receiving three-wire synchro input signals representing an angle $\theta$ and for producing a pair of two wire synchro output signals representing $\sin \theta$ and $\cos \theta$ respectively, a first demodulator circuit as defined in claim 1 coupled to one of said synchro output signals; a second demodulator circuit as defined in claim 2 coupled to the other synchro output signal; and output means coupled to the output of said first and second demodulator circuits.

3. A demodulator circuit comprising a transformer having an input winding, a single-ended secondary winding, and a center-tapped secondary winding; a first rectifier circuit having input and output terminals, the input terminals thereof being coupled between the ends of said single-ended secondary winding; a 90 degree phase shift circuit having input terminals and an output terminal, the input terminals thereof being coupled between the ends of said center-tapped secondary winding; a second rectifier circuit having input and output terminals, the input terminals thereof being coupled between the center-tap of said center tapped secondary winding and the output terminal of said phase shifter, and the output terminals of said first and second rectifiers being coupled together in series aiding to add the rectified signals together and thereby produce a demodulated output signal.

4. The combination defined in claim 3 wherein said rectifier circuits comprise full-wave bridge rectifiers and wherein said phase shift circuit comprises a resistor and capacitor coupled together in series, said phase shift output terminal comprising the junction of said resistor and said capacitor.

References Cited

UNITED STATES PATENTS

| | | | |
|---|---|---|---|
| 2,397,961 | 4/1946 | Harris | 329—145 |
| 2,580,148 | 12/1951 | Wirkler | 329—146 X |
| 3,229,231 | 1/1966 | Saraga | 329—50 |
| 3,243,791 | 3/1966 | Currie | 329—50 |

ALFRED L. BRODY, *Primary Examiner.*